E. L. LARSON.
SPRING SEAT.
APPLICATION FILED AUG. 14, 1917.
1,323,874.
Patented Dec. 2, 1919.
2 SHEETS—SHEET 1.
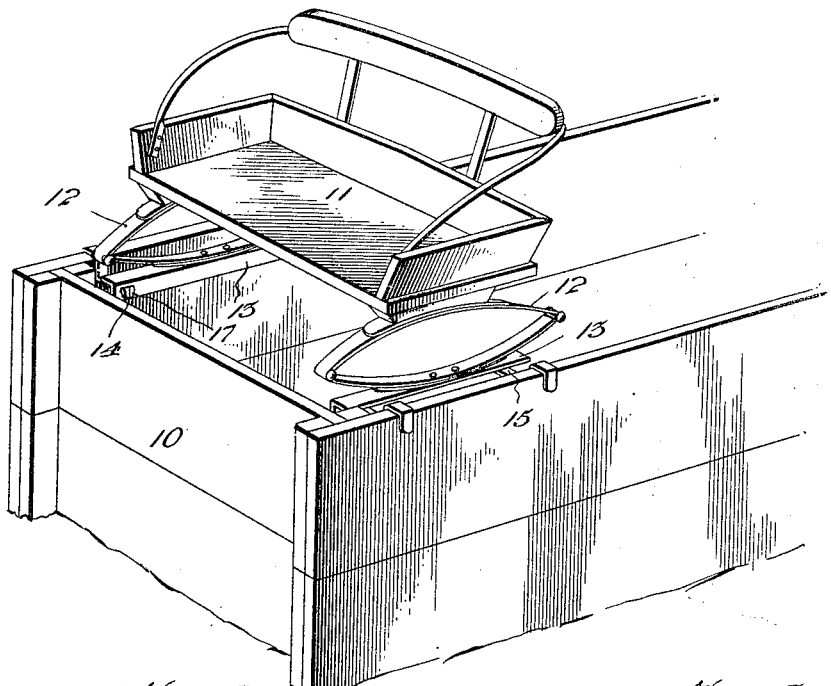
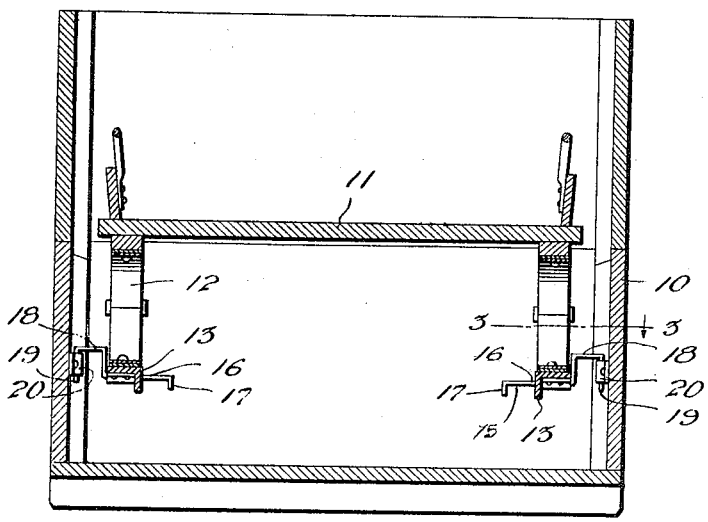
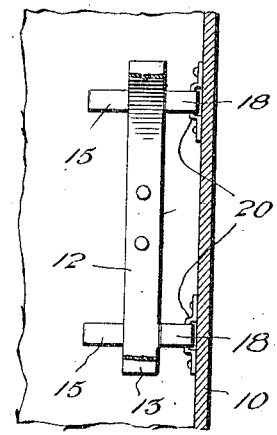
INVENTOR
Edwin L. Larson.
BY *Victor J. Evans*
ATTORNEY
WITNESSES

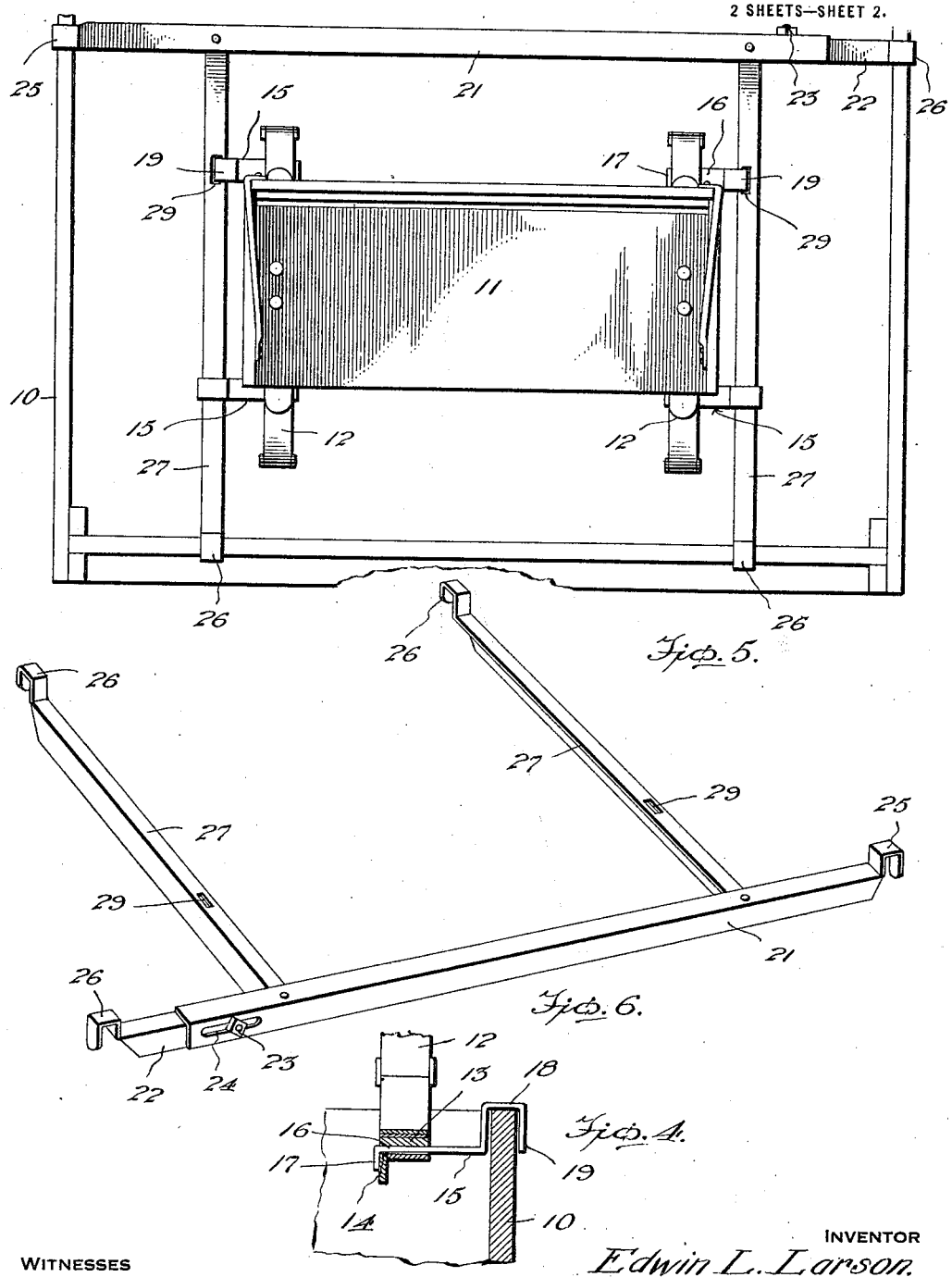

UNITED STATES PATENT OFFICE.

EDWIN L. LARSON, OF VOLTAIRE, NORTH DAKOTA.

SPRING-SEAT.

1,323,874.　　　　　Specification of Letters Patent.　　Patented Dec. 2, 1919.

Application filed August 14, 1917. Serial No. 186,167.

*To all whom it may concern:*

Be it known that I, EDWIN L. LARSON, a citizen of the United States, residing at Voltaire, in the county of McHenry and State of North Dakota, have invented new and useful Improvements in Spring-Seats, of which the following is a specification.

This invention relates to vehicle seats and aims to provide means whereby a spring seat may be supported in various positions upon the vehicle body.

The primary object of the invention is to provide a seat which may be placed upon the side edges of the vehicle body in the usual manner in order that the vehicle may be loaded to its full capacity and which is so constructed that the seat may be supported within the body of the vehicle for the purpose of protecting the driver from severe weather or cold climates, adjusting means being provided which are engageable both with the side edges of the body and with sockets located within these side edges.

It is also the purpose of the invention to provide an adjustable supporting frame, which may be removably positioned upon the vehicle body to support the seat, permitting of a wider use of the seat than would otherwise be possible.

With the above and other objects in view, the invention consists of the following novel combination and arrangement of parts, hereinafter more fully described and illustrated in the accompanying drawings, in which Figure 1 is a perspective view of a seat positioned upon the side edges of the wagon body in the usual manner;

Fig. 2 is a cross-sectional view with the seat in position within the wagon body;

Fig. 3 is a horizontal sectional view on the line 3—3 of Fig. 2;

Fig. 4 is a detail cross-sectional view showing the mounting of the adjustable hook member and its engagement with the wagon body;

Fig. 5 is a modified form of supporting seat; and

Fig. 6 is a similar view showing the supporting frame detached from the wagon body and the seat removed from the said frame.

It has heretofore been the custom to support seats upon the side edges of springless farm wagons, the seats themselves being provided with springs for the purpose of reducing the jolting incident to travel over rough roads. These seats as at present constructed are made to fit bottoms of wagons of a given width and may not be used with wagons of any other width. There is nothing for supporting these seats in any other position upon the side edges of the vehicle body and should it be desirable to place the seats within the body of the vehicle, they must be placed longitudinally of the body, owing to the length of the seats and their supporting means being greater than the width of the body. In extremely cold climates, it is often desirable to position the seats within the vehicle body in order that the occupants thereof may be protected from the weather and it is for the purpose of accomplishing this and of foregoing the disadvantages above enumerated that the following invention has been provided.

Referring to the drawings in detail, the numeral 10 indicates a vehicle body and 11 the seat. The seat 11 has secured beneath the same the usual springs 12 and secured to the bottom of these springs longitudinally thereof is an angle iron 13. This iron is formed with longitudinally disposed slots 14 which are located adjacent each end thereof and receive within each of these slots the supporting member 15.

The member 15 includes a horizontal portion 16, which is adapted to move transversely of the slots 14, one end of this portion being provided with a downwardly turned end 17 for the purpose of limiting the movement of the supporting member in one direction. The opposite end of the horizontal portion 16 is bent at right angles and extends as shown at 18, terminating in a hook 19, which is adapted to engage over the side edges of the vehicle body 10, so as to support the said seat upon the vehicle in the usual manner.

Located within the vehicle body and secured to the inner sides thereof are spaced alined socket members 20, which are spaced in the bottom of the vehicle body and are adapted to receive the hooks 19, after the same have been adjusted to the proper width so that the seat may be positioned within the bottom of the vehicle.

If desired, the vehicle body may be provided with side and end extensions in order to increase the capacity of the vehicle and the seat may be either positioned upon the upper edges of these extensions or within the body as desired.

In order to accommodate the seat to wagon bodies of the character in Figs. 5 and 6, there is provided a frame which includes a bar 21 adapted to be positioned transversely of the body and made adjustable by securing to one end thereof an extension 22, by means of a bolt 23 carried by the said extension and adjustable with the slot 24 formed in the bar 21. The opposite end of the bar 21 is provided with a hook 25, while the outer end of the extension 22 is also provided with a hook 26, so that the said bar may be supported by being hung from the side edges of the body as shown in Fig. 5.

Pivotally secured to the bar 21, which is formed of angle iron are bars 27, one of said bars being secured adjacent each of the ends of the bar 21. The bars 27 carry at their opposite ends hooks 26, by means of which they are engaged over the front edge of the vehicle body. Formed in each of the bars 27 is a slot 29, the slots being transversely alined and adapted to receive one of the hooks 19 of the seat 11, the other hook being adjusted to fit over each of the bars 27 to support the front end of the angle irons 13. When in this position the front wall of the vehicle body forms a foot rest for the driver.

It is believed that from the foregoing description, when read in connection with the accompanying drawings, the construction, operation and advantages of the invention will be apparent. The right is reserved to make such changes in the form and proportion thereof as will fall within the scope of the claim hereto appended.

Having described the invention, what is claimed is:

The combination with a vehicle body and its seat, of hook members slidably connected with the seat, a telescopic bar having hooked ends adapted to engage with the upper edge of the body, a pair of bars pivotally mounted to the telescopic bar and having their hooked ends adapted to engage with the vehicle body and said bars having slots therein for receiving the hook members on the seat.

In testimony whereof I affix my signature.

EDWIN L. LARSON.